UNITED STATES PATENT OFFICE.

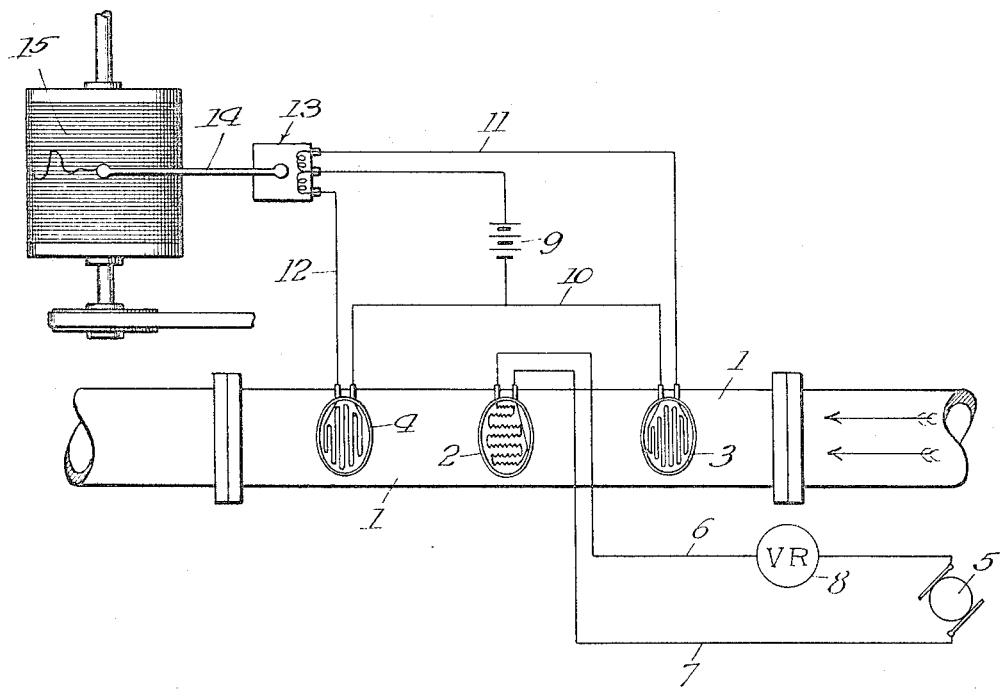

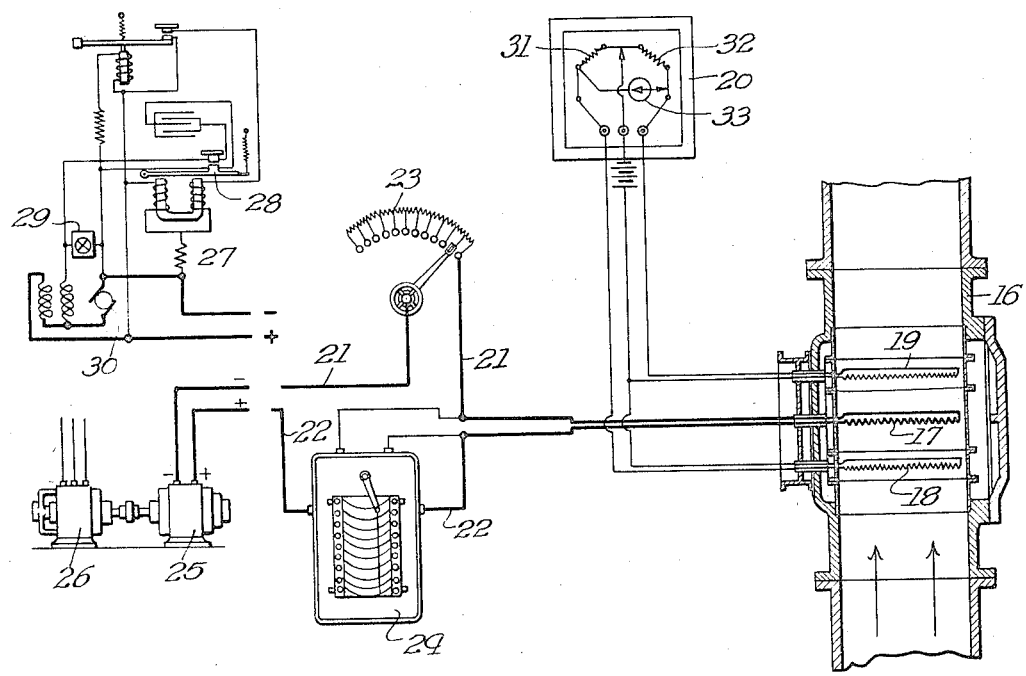
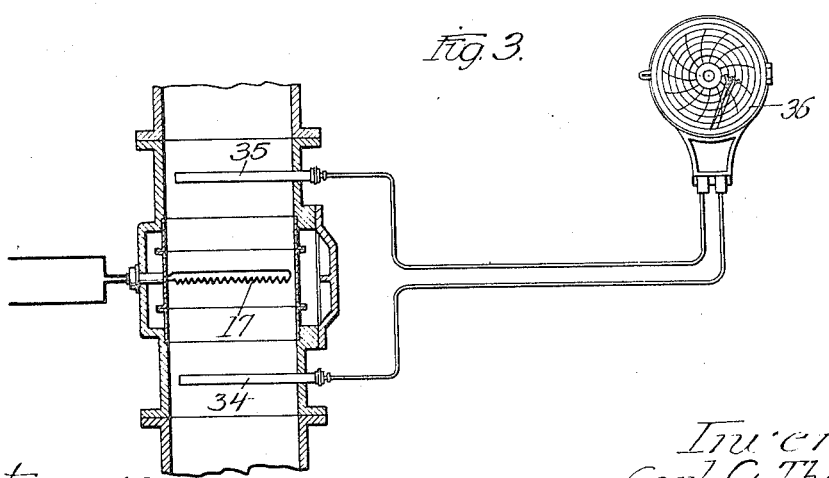

CARL C. THOMAS, OF BALTIMORE, MARYLAND.

METER.

1,254,374. Specification of Letters Patent. Patented Jan. 22, 1918.

Application filed June 27, 1916. Serial No. 106,107.

*To all whom it may concern:*

Be it known that I, CARL C. THOMAS, a citizen of the United States, residing at Baltimore, State of Maryland, have invented new and useful Improvements in Meters, of which the following is a specification.

This invention relates to meters.

It relates particularly to meters in which thermal or thermodynamic effects are used for measuring the flow of fluids such as gas, steam and the like.

Meters of this type operate, in general, as follows:

The specific heat of the fluid to be measured being known, the flow thereof is measured by determining the effect of heat transfer between a stream of said fluid and a body or medium subjected thereto. The rate of heat transfer and the effect of the heat transfer on the fluid may both be measured and the results compared to obtain the rate of flow, or either the rate of heat transfer or the effect of the heat transfer on the fluid may be kept constant and the other variable measured to determine the rate of flow.

These several methods are described in the patent to Carl C. Thomas, No. 1,193,488 of August 1, 1916. The present application is a continuation in part of an application filed April 14, 1909 which resulted in said patent, particularly as to the method and apparatus in which the flow is measured by maintaining the rate of heat transfer constant and measuring the effect thereof on the fluid.

One of the objects of the invention is to provide an improved thermal fluid meter in which the rate of heat transfer to the fluid is maintained constant and the effect of the heat transfer on the fluid is indicated or recorded to give directly the rate of flow.

Other objects and advantages of the invention will hereinafter appear.

Several embodiments of the invention are illustrated in the accompanying drawings. The views of the drawings are as follows:

Figure 1 is a diagrammatic view illustrating one form of meter.

Fig. 2 is a diagrammatic view illustrating an alternative form.

Fig. 3 is a diagrammatic view illustrating still another form of meter.

The meter comprises, in general, a conduit 1, a heater 2 to which heat is supplied at a constant rate and thermometers having resistances 3 and 4 for measuring the effect on the fluid of the heat transfer.

The conduit 1 may be of any suitable type. As illustrated it comprises a pipe adapted to form a section of a gas main or the like through which the fluid to be measured flows. The conduit, in some cases, constitutes a meter housing through which a stream of the fluid is directed. It is preferably, in all cases, provided with inlet and outlet openings which may be readily attached to gas or steam mains so that the meter may be inserted in the pipe line without requiring alterations thereof.

The heater 2 comprises an electric resistance wire suitably supported and insulated from a frame which is adapted to be mounted in the conduit. The construction of this heater may be varied to suit the requirements, a suitable structure being illustrated and described in detail in the patent to Thomas, No. 1,043,983, November 12, 1912. It is to be understood that any form of heater to which the rate of heat supply can be maintained constant is suitable for use in the meter.

Electrical energy is supplied to the heater 2 from a source of electrical energy 5 which is connected to the heater by the conductors 6 and 7.

The rate of energy supply to the heater may be maintained substantially constant in various ways. If the heater is connected to a constant voltage supply line and the resistance of the heater is constant at different temperatures, the energy or wattage will remain nearly constant. If the voltage of the supply mains is not sufficiently constant, a suitable voltage regulator 8 may be used for maintaining a nearly constant voltage supply to the heater. Voltage regulators for maintaining a constant voltage are well-known in the electrical art and any suitable known form may be used. A standard Tirrill regulator, such as illustrated in Fig. 2, can be used for this purpose.

Other arrangements for maintaining a constant energy supply may be employed as will be hereinafter described.

The thermometers comprise resistance elements 3 and 4 formed of electric resistance wire whose resistance varies with its temperature, said wire being suitably supported and insulated by a frame which is constructed so that it may be readily mounted in a conduit. These resistance elements may assume various forms. A structure suitable for use in the present meter is illustrated and described in Thomas Patent No. 1,043,983, November 12, 1912. It is, of course, to be understood that other forms of thermometers than those therein disclosed may be used if desired.

The thermometer resistances are supplied with electrical energy from a battery or other source 9 which is connected by means of a common conductor 10 to one terminal of each of the thermometer resistances, the other terminal of each thermometer resistance being connected by the conductors 11 and 12 respectively to the temperature difference recorder 13, to the middle terminal of which is connected a conductor from the battery 9.

This temperature difference recorder is a well-known instrument in the electrical art and it has therefore been illustrated only diagrammatically. It has two coils, one of which is connected in the circuit of one thermometer resistance and the other in the circuit of the other thermometer resistance. These coils act differentially to control a needle 14 which bears on a moving chart 15. The currents in the coils are dependent upon the resistances of the wire of the resistance elements, which resistances are dependent upon the temperature of said wires. Changes in temperature of the fluid being measured cause changes in the resistance of the wires of the resistance elements 3 and 4, which cause changes in the current flow in the respective thermometer circuits and consequently in the current flow through the coils of the recorder. The needle 14 responds to the variations in the current flow through the coils and records directly the temperature difference between the two thermometer resistance elements 3 and 4. The moving chart 15 is calibrated so that the record traced by the needle 14 gives a direct measurement of the rate of flow of fluid through the conduit 1.

The operation of the meter is as follows:
The dry fluid to be measured passes through the conduit 1 in the direction of the arrows. As it passes the heater 2 its temperature is raised an amount which is dependent upon the specific heat of the fluid, its rate of flow and the rate at which energy is imparted thereto.

The specific heat of the fluid remains approximately constant. This factor is determined and the meter calibrated accordingly so that the specific heat need not be measured in the actual operation of the meter.

The energy input to the heater 2 is kept constant by automatic regulation. As hereinbefore described this is preferably done by regulating the voltage of the heating current. The energy input depends directly upon the voltage of the supply and the resistance of the heater. If both of these are constant the energy input is necessarily constant.

The energy input being maintained constant and the specific heat being constant, any variations in the temperature rise of the fluid are due to variations in the third factor; namely, the rate of flow of fluid. A measure of the temperature rise of the fluid is therefore a measure of the rate of flow and when the meter is calibrated properly this flow may be indicated directly in proper units.

The thermometer resistance element 3 measures the temperature of the incoming fluid and the thermometer resistance element 4 measures the temperature of the fluid after it passes the heater. These thermometer resistances are connected as previously described to the temperature difference recorder 13. The needle 14 records directly any variations in the temperature difference of the thermometer resistances. The record traced by the needle on the chart is therefore a measure of the rate of flow.

Fig. 2 illustrates another form of meter in which alternative means for maintaining a constant energy input to the heater is shown.

The meter comprises a housing 16 through which the fluid to be measured flows, an electric heater 17 and electric thermometer resistances 18 and 19 which are connected to a temperature difference recorder 20.

The heater 17 comprises an electric resistance wire suitably supported and insulated by a frame which is mounted in the meter housing. The heater is supplied with energy through mains 21 and 22 which are connected to a source of constant energy supply. The main 21 has connected therein an adjustable rheostat 23 by means of which the volume of the energy supply to the heater may be regulated. A graphic wattmeter 24 is connected in the main 22 to record the energy input to the heater. This meter records the wattage input and serves as a check to determine whether or not the input is constant. In case any abnormal conditions arise the wattmeter gives a record of any variation in the wattage supply.

The supply of energy to the mains 21 and 22 may be maintained constant in any of the ways hereinbefore described or by means of the apparatus illustrated in Fig. 2.

One method of supplying constant energy is to provide a generator 25 driven by a constant speed motor 26. If the current supply to the motor is alternating, a three-phase motor may be used. The speed will then be a function of the cycles of the three-phase power. The cycles in a good industrial power supply are nearly constant.

Under these conditions the motor is substantially independent of the voltage of the three-phase supply and it runs at a constant speed to drive the generator 25 which supplies constant voltage to the mains 21 and 22.

The motor which drives the generator may also be supplied with a governor to regulate its speed. Governors of various types for this purpose are so well-known in the electrical art that it is not considered necessary to describe them herein.

The voltage of the supply to the mains 21 and 22 may also be kept constant by means of a Tirrill regulator 27. This regulator is also well-known in the art. It is employed to maintain constant voltage at points where such voltage is desired. In general, it comprises a pair of contacts 28 which are vibrated by an electromagnet to insert and remove a resistance 29 in the shunt field of the generator 30 to maintain the voltage of the generator constant.

The temperature difference recorder 20 is of a well-known type and it has therefore been illustrated only diagrammatically. It is connected to the thermometer resistances 18 and 19 in the same manner as the temperature difference recorder in Fig. 1. Coils 31 and 32 which are energized respectively by the currents through the thermometer resistances 18 and 19 control a needle 33 which either indicates or records directly the temperature difference of the thermometer resistances.

The operation of this meter is similar to that of the meter shown in Fig. 1.

Fig. 3 illustrates an alternative form of meter in which thermometers of a different type are used. The bulbs 34 and 35 of these thermometers and the temperature recorder 36 are of a type known as Bristol temperature recorders.

The thermometer bulbs 34 and 35 contain a fluid whose volume or condition depends upon its temperature. The thermometer bulbs are connected by suitable tubes to pressure gages in the recorder 36. These gages control needles bearing on a movable chart carried by the recorder. Each thermometer traces a record of its temperature on the chart and the difference between the two records is a measure of the temperature difference of the thermometers.

It is to be understood that the structure shown is for purposes of illustration only and that other structures may be devised which come within the spirit and scope of the appended claims.

What I claim and desire to secure by Letters Patent is:—

1. The method of measuring the flow of fluids which consists in causing a heat transfer at a constant rate between a stream of said fluid and a body or medium subjected thereto, and utilizing the effect on said fluid of the heat transfer in determining the rate of flow of the fluid.

2. The method of measuring the flow of fluids which consists in passing a stream of said fluid into proximity to a body or medium having a different temperature from said fluid, maintaining the rate of heat energy supply to said body or medium constant, and utilizing the temperature difference of the fluid before and after passing the body or medium in determining the rate of flow of the fluid.

3. The method of measuring the flow of fluids which consists in supplying heat to a stream of said fluid at a constant rate and utilizing the rise in temperature produced in said fluid in determining the rate of flow of the fluid.

4. The method of measuring the flow of fluids which consists in supplying heat to a stream of said fluid at a constant rate and determining the rate of flow of the fluid by measuring directly the difference in temperature of the fluid before and after heating.

5. The method of measuring the flow of fluids which consists in passing a stream of said fluid into proximity to an electric heater to which electrical energy is supplied at a constant rate and utilizing the temperature of the fluid before and after passing the heater in determining the rate of flow of the fluid.

6. The method of measuring the flow of fluids which consists in passing a stream of said fluid into proximity to an electric heater to which electrical energy is supplied at a constant rate and determining the rate of flow of the fluid by measuring directly the difference in temperature of the fluid before and after passing the heater.

7. A meter for measuring the flow of fluids having means for imparting heat to a stream of said fluid at a constant rate, and temperature indicating means responsive to the temperature of the fluid before and after heating.

8. A meter for measuring the flow of fluids comprising a housing, a heater in said housing, means for supplying heat to said heater at a constant rate, and temperature indicating means responsive to the temperature of the fluid before and after heating.

9. A meter for measuring the flow of fluids comprising a housing, a heater within said housing, means for supplying heat to said heater at a constant rate, and means for measuring directly the difference in temperature of the fluid before and after passing the heater.

10. A meter for measuring the flow of fluids comprising a housing, an electric heater within the housing, means for supplying energy to said heater at a constant rate, and means for measuring the temperature rise of the fluid produced by the heater.

11. A meter for measuring the flow of fluids comprising a housing, an electric heater within said housing, means for supplying energy to said heater at a constant rate, electric resistance thermometer elements on opposite sides of said heater, and a temperature difference recorder connected to said thermometer elements to measure directly the difference in temperature of the fluid before and after heating.

12. A meter for measuring the flow of fluids having means subjected to a flowing stream of said fluid, between which means and said fluid there is a heat transfer, means for maintaining the rate of electrical energy supply to said means constant, and temperature indicating means responsive to the temperature of the fluid before and after passing the first named means.

13. A meter for measuring the flow of fluids having means for imparting heat to a stream of said fluid at a constant rate, and temperature indicating means responsive to variations in the temperature of the fluid before and after heating to give a record of the rate of flow.

14. A meter for measuring the flow of fluids comprising a housing, an electric heater within said housing, means for supplying energy to said heater at a constant rate, electric resistance thermometer elements on opposite sides of said heater and a temperature difference recorder connected to said thermometer elements to record directly variations in the temperature of the fluid before and after heating.

15. The method of measuring the flow of fluids which consists in causing a heat transfer at a constant rate between a stream of said fluid and a body or medium subjected thereto, and utilizing the effect of the heat transfer in determining the rate of flow of the fluid.

In witness whereof, I have hereunto subscribed my name in the presence of two witnesses.

CARL C. THOMAS.

Witnesses:
MARY M. MAGRAW,
HARRIET S. MAGRAW.